United States Patent [19]

Gentry et al.

[11] Patent Number: 5,159,773
[45] Date of Patent: Nov. 3, 1992

[54] ELECTRIFIED FISHING LURE

[76] Inventors: Scott B. Gentry, 77221 Hipp Rd., Romeo, Mich. 48065; Joseph F. Mazur, 58471 Winston, Washington, Mich. 48094; Brian K. Blackburn, 124 Glendale, Rochester, Mich. 48307

[21] Appl. No.: 825,039

[22] Filed: Jan. 24, 1992

[51] Int. Cl.⁵ .............................................. A01K 85/01
[52] U.S. Cl. ........................................ 43/17.1; 43/17.6
[58] Field of Search ....................... 43/17.1, 17.5, 17.6

[56] References Cited

U.S. PATENT DOCUMENTS

| | | | |
|---|---|---|---|
| 2,303,097 | 11/1942 | Townsend | 43/17.6 |
| 2,757,475 | 8/1956 | Pankove | 43/17.1 |
| 3,068,604 | 12/1962 | Nyberg | 43/17.1 |
| 4,227,331 | 10/1980 | Urshey | 43/17.6 |
| 4,583,313 | 4/1986 | Dugan | 43/17.1 |
| 4,625,447 | 12/1986 | Buchanan | 43/17.1 |

OTHER PUBLICATIONS

Sports Afield for Sep. 91, p. 56 "New Gear Review" article of Fish Caller of Vortex Lures.

Primary Examiner—Kurt C. Rowan
Attorney, Agent, or Firm—Peter D. Keefe

[57] ABSTRACT

A lure electrified by a piezoelectric material located with respect to the body of the lure so that at least a portion thereof is subjected to flexing as the lure moves through the water. The flexing of the piezoelectric material produces an electromotive force (EMF) which is connected to an electronic device, such as a neon bulb for providing an effect attractive to fish.

10 Claims, 2 Drawing Sheets

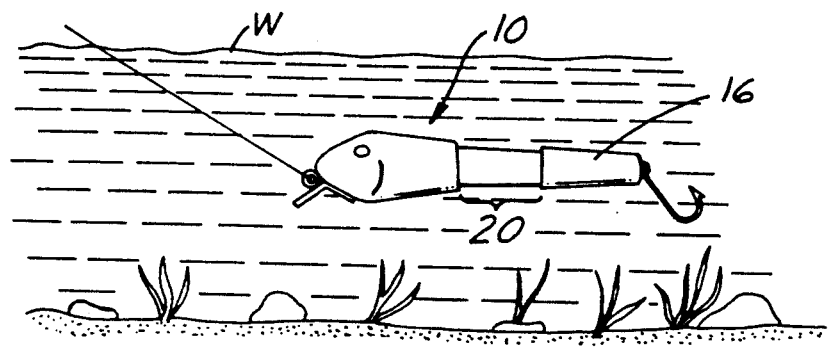
FIG. 1
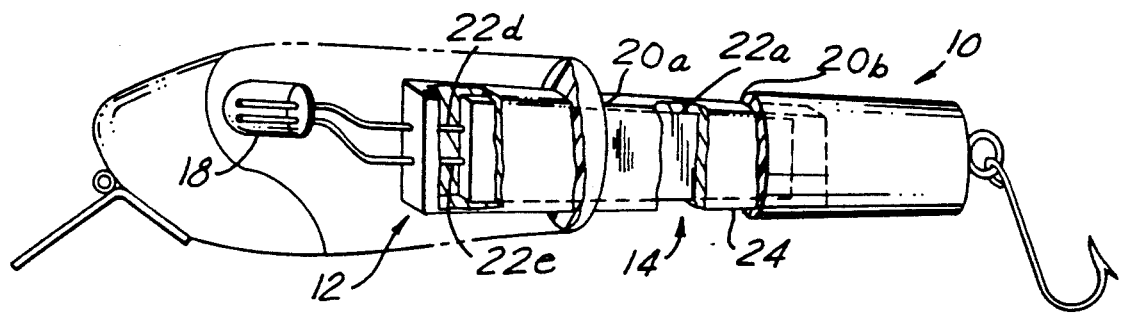
FIG. 2
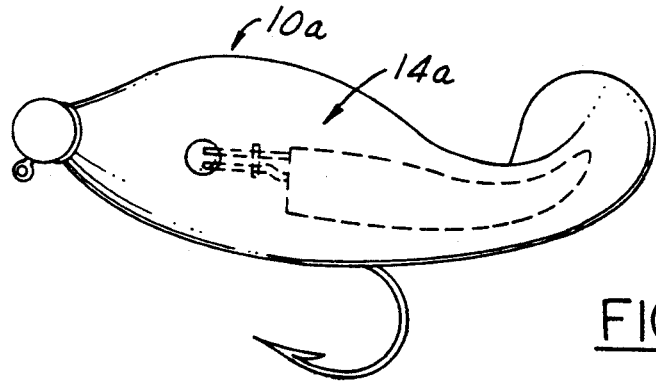
FIG. 3
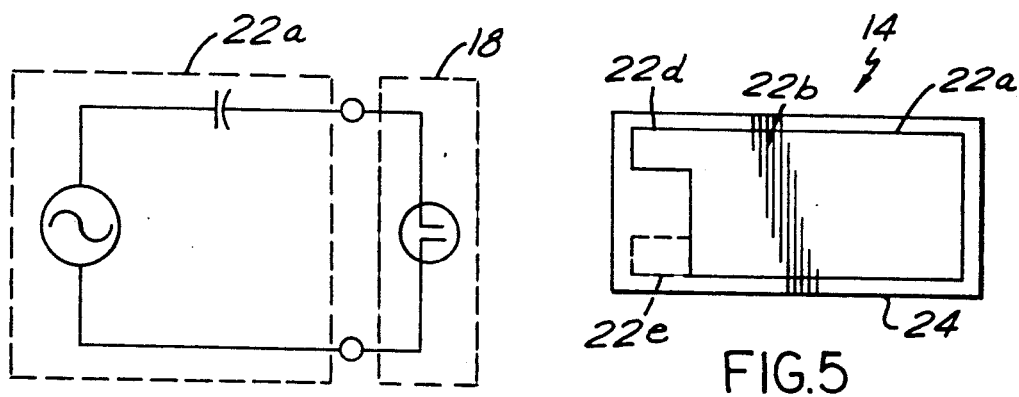
FIG. 4
FIG. 5

ELECTRIFIED FISHING LURE

BACKGROUND OF THE INVENTION

1. Field of the Invention

The present invention relates to fishing lures, and more particularly to fishing lures provided with electrification apparatus for attracting fish to the lure. Still more particularly, the present invention relates to a fishing lure provided with electrification apparatus powered by a piezoelectric film material actuated by movement of the lure through the water.

2. Description of the Prior Art

While it may be said that fishing is the world's most relaxing sport, the fact is that if fish aren't being caught, the fisherman will undoubtedly experience anxiety rather than relaxation. While many kinds of shapes and colors of lures have been developed to attract fish to strike, all are at the mercy of a fish happening to swim close enough near the lure to see it and then be attracted to strike it.

Consequently, various devices have been developed to aid the fisherman to attract fish to strike his or her lure. For example, some lures are provided with sound producing means that emit high and low frequencies which are attractive to game fish. Other lures are equipped with illumination means, such as a light bulb which is intended to attract the eye of a distant fish to strike at the lure. An exemplary manufacturer of such lures is Vortex Lure Company of Kalispell, MT. The major drawback of these lures is the need for battery energization which entails a disadvantageously limited operational life before replacement is necessary, as well as undue weighting of the lure, even if a small battery, such as a hearing aid battery, is used.

One solution forwarded in the prior art to overcome the drawback of battery weight, is the installation of a chemical stick into the lure. While these devices may or may not be lighter, they suffer from a limited life span of about five to ten minutes, and must, like batteries, be continually replaced into the lure.

Therefore, in view of the excellent track record of illuminated lures for catching fish, what is needed is a lure which is illuminated without need of batteries, chemical sticks or other type of consumable power source. Still further, what is needed is such a lure which is of light weight.

SUMMARY OF THE INVENTION

The present invention is a lure which is electrified without need of batteries, chemical sticks or other type of consumable power source, and yet is durable, reliable and light in weight.

The electrified lure according to the present invention is equipped with a piezoelectric material which is located with respect to the body of the lure so that at least a portion thereof is subjected to flexing as the lure moves through the water. The flexing of the piezoelectric material produces an electromotive force (EMF) which is connected to an electronic device structured and functioning with respect to the lure body for attracting fish, such as a neon bulb.

The present invention contemplates readily adapting the structure of the body of popular kinds of lures so as to include the piezoelectric material and associated electronic device for attracting fish in the manner disclosed herein by way of example with respect to a number of such lures.

Accordingly, it is a general object of the present invention to provide an electrified lure in which an electronic device for attracting fish is powered by the lure moving through the water.

It is a further object of the present invention to provide an electrified fishing lure in which the lure is electrically powered by movement of the lure through the water and yet the lure is not structurally burdened by the power source, is light weight, durable and reliable.

It is a more specific object of the present invention to provide an illuminated fishing lure which is equipped with a piezoelectric material in which the body of the lure is structured so that the piezoelectric material flexes during movement of the lure through the water, thereby providing a powering EMF for an illumination device associated with the lure.

These, and additional objects, advantages, features and benefits of the present invention will become apparent from the following specification.

BRIEF DESCRIPTION OF THE DRAWINGS

FIG. 1 is is a side view of a fishing lure in operation, the lure having been equipped with an electrification system according to the present invention.

FIG. 2 is a partly cut-away perspective view of the fishing lure shown in FIG. 1, showing internal components.

FIG. 3 is a perspective view of another fishing lure type that is equipped with the electrification system according to the present invention.

FIG. 4 is a schematic circuit diagram for an electrification system for a fishing lure according to the present invention.

FIG. 5 is a side view of a piezoelectric material construction suitable for use in an electrification system in a fishing lure structured according to the present invention.

DETAILED DESCRIPTION OF THE PREFERRED EMBODIMENT

Figure 6:
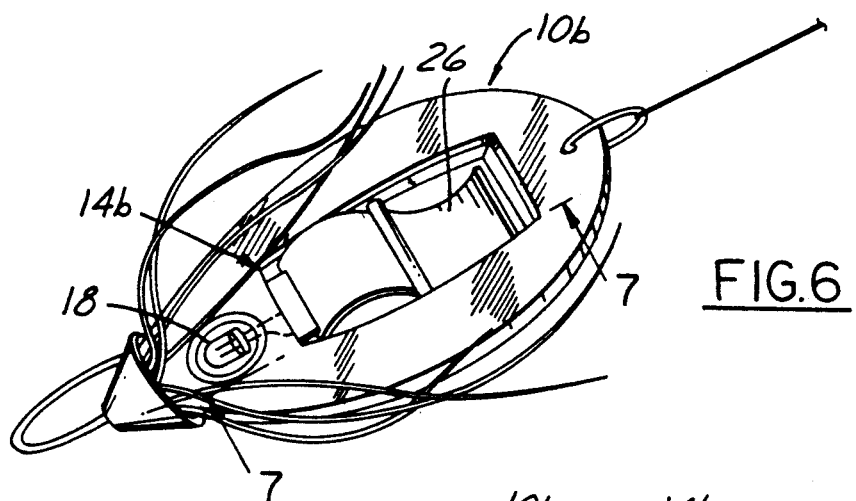
FIG. 6 is a perspective view of yet another fishing lure equipped with the electrification system according to the present invention.

Referring now to the Drawing, the general aspects of the present invention are depicted in FIGS. 1 and 2. A fishing lure 10, shown, by way of example, as a popular minnow-like lure, has been equipped with an electrification system 12 according to the present invention. The electrification system 12 is composed generally of a piezoelectric member 14 flexibly connected with respect to the body 16 of the lure 10 and an electronic device 18 which is electrically connected with the piezoelectric member. The piezoelectric member 14 is connected with the body 16 of the lure 12 in such a manner that it may flex as the lure is moved through the water W. In the lure example depicted in FIGS. 1 and 2, a central portion 20 of the body 16 of the lure 10 is constructed sufficiently thin so that flexibility of the body at this location occurs as the lure moves relative to the water. The piezoelectric member 14 preferably includes a thin, flexible piezoelectric film that is mechanically connects with each end 20a, 20b of the central portion 20 of the body 16. As the lure 10 moves relative to the water, flexing of the piezoelectric member 14 causes an EMF to be delivered to the electronic device 18, thereby providing a preselected fish attracting effect.

The piezoelectric member 14 includes a piezoelectric material of a kind well known in the art, in which a mechanical stress applied to the piezoelectric material results in production of an EMF between selected locations of the material. A preferred piezoelectric material for the piezoelectric member 14 is a piezopolymer film, such as polyvinylidene fluoride (PVDF). More specifically as shown in FIG. 5, the piezoelectric member 14 includes a piezopolymer film 22a having sides 22b (only one side 22b being shown in FIG. 5). Electrically connected to each side 22b is, respectively, an electrode 22d and 22e which collectively provide an EMF therebetween whenever the piezopolymer film 22a is flexed. The piezoelectric member 14 is preferred to include a flexible film 24, such as a plastic film, located adjacent both (preferably) sides of the piezopolymer film 22a. In the example depicted in the Drawing, the flexible film 24 is shown connect to and encasing the piezopolymer film 22a. The flexible film 24 serves to supply structural strength and flexing regulation to the piezopolymer film so that flexing thereof is spread over a relatively large portion of the sides 22b. Maximizing the portion of the piezopolymer film 22a which is involved in flexing is important in order that a relatively large EMF is producible at the electrodes 22d and 22e for purposes of electrically powering the electronic device 18. FIG. 4 shows a schematic electrical diagram for wiring the piezoelectric film 22a to the electronic device 18.

As indicated hereinabove with respect to the fishing lure 10 depicted in FIGS. 1 and 2, the body 16 is constructed to include a central portion 20 whereat is situate a substantial portion of the piezoelectric member 14. The piezoelectric member 14 spans the central portion 20 of the body 16, and is anchored into the body at either end 20a, 20b of the central portion. Flexing of the lure is, accordingly, made possible by flexible movement of the piezoelectric member 14.

The electronic device 18 can be any electrically powered device which provides an effect that attracts fish. In the Drawing, a preferred electronic device 18 is shown, by way of example, in the form of a neon bulb; accordingly, the effect produced thereb is light emission from the lure. The electronic device 18 is secured to the lure in a substantially conventional manner so that the effect produced by the electronic device can be detected by fish and thereby attract them to the lure 10. The electronic device 18 is preferred to be selected so as to be particularly responsive to the typical EMF produced by piezoelectric materials, such as for example, a neon bulb.

In operation, the fisherman connects the lure 10 to his or her fishing rod line in a conventional manner. The lure is then cast and retrieved. As the lure is retrieved it will pass through the water and flex at the central portion of the body. As the piezoelectric member flexes, an EMF is produced which powers the electronic device 18. Advantageously, electrical power is automatically provided whenever the lure is used, without worry of possible deterioration of components of the electrification system 12 in the event the lure is stored for long periods of time in a tackle box. Importantly, this is achieved without need of a costly, bulky and weighty chemical stick or battery.

While FIGS. 1 and 2 depict an example of a modified minnow-type lure, those skilled in the art may modify such a lure in other ways in which to provide flexibility for the piezoelectric material, such as by placing the piezoelectric member at the tail of the body rather than at the central portion of the body. Naturally, such modifications are within the scope of the teachings of the disclosure herein.

The present invention contemplates modification of many other popular lures for operation with respect to the electrification system 12 according to the present invention. Accordingly, FIGS. 3 and 6 through 9 depict examples of such modified lures.

FIG. 3 shows a modified jig-type lure 10a, in which a piezoelectric member 14a is located within the already flexible body of the lure. As the lure is jigged or otherwise moved through the water, the body flexes, thereby resulting in an EMF at the electronic device 18, with a resulting effect being produced which is attractive to fish.

Figure 7:
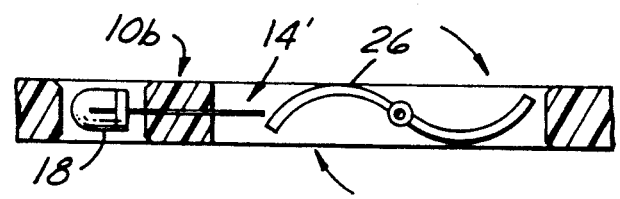
FIG. 7 is a partly sectional side view of the fishing lure of FIG. 6, seen along lines 7—7 in FIG. 6.

FIGS. 6 and 7 depict a modified "weed walker" type lure 10b, in which a spinner 26 is centrally mounted on the body of the lure, and which rotates as the lure is moved through the water. As the spinner 26 rotates, it strikes a piezoelectric member 14b to thereby cause it to flex and produce a powering EMF for the electronic device 18.

Figure 8:
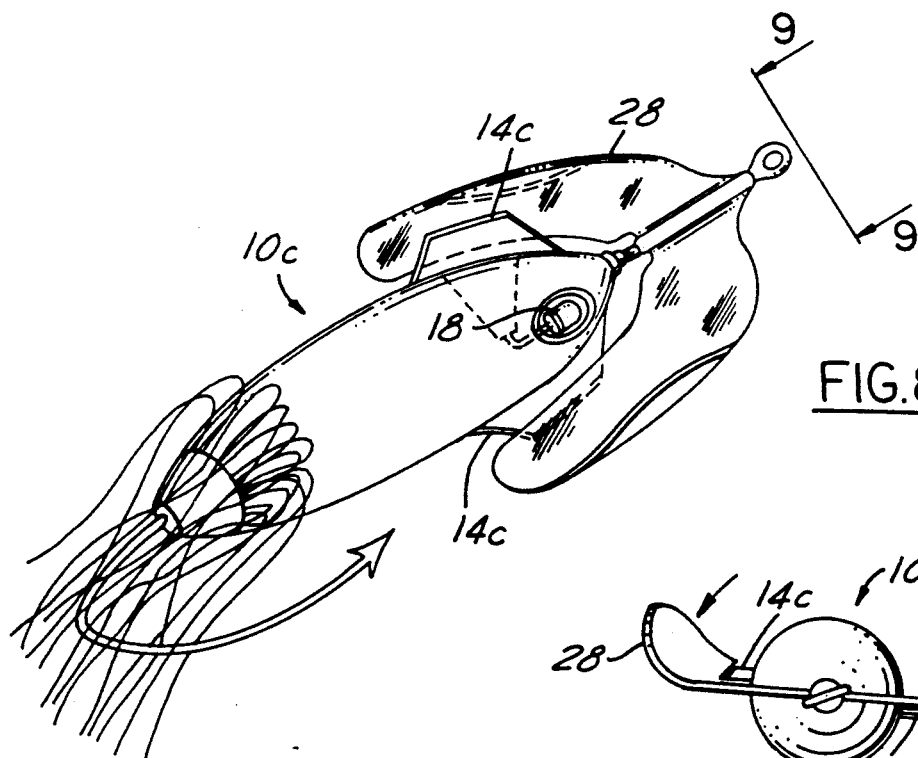
FIG. 8 is a perspective view of still another fishing lure equipped with the electrification system according to the present invention.
Figure 9:
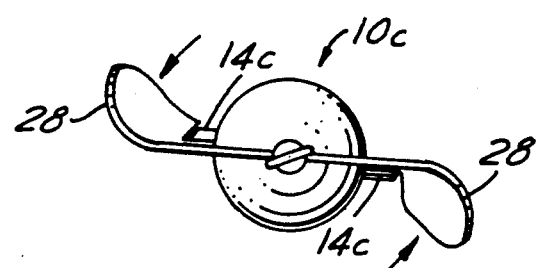
FIG. 9 is a rear view of the fishing lure of FIG. 8, seen along lines 9—9 in FIG. 8.

FIGS. 8 and 9 depict a modified "grass rat" type lure 10c, in which a propeller 28 is frontally mounted on the body of the lure, and which rotates as the lure is moved through the water. As the propeller 28 rotates, it strikes a piezoelectric member 14c, shown located at two opposite sides of the body of the lure, to thereby cause it to flex and produce a powering EMF for the electronic device 18.

To those skilled in the art to which this invention appertains, the above described preferred embodiment may be subject to change or modification. For instance, any lure may be modified to include the electrification system according to the present invention, keeping in mind that a shape of lure body attractive to fish is configured to provide for at least a portion of a piezoelectric member to be subject to flexing action in response to movement of the lure relative to the water. Further, while an illumination device is described herein with respect to the preferred embodiments elaborated, an alternative electronic device other than an illumination device may be substituted at reference numeral 18 in the Drawing, such as for example, a sound producing device of the sort described hereinabove with respect to the prior art or a liquid crystal display, either of which being electrically connected with the electrodes along with the illumination device or substituted therefor. Such change or modification can be carried out without departing from the scope of the invention, which is intended to be limited only by the scope of the appended claims.

What is claimed is:

1. An electrified fishing lure, comprising:
a lure body;
a piezoelectric member flexibly connected to said lure body so that said piezoelectric member flexes in response to said lure body being moved through water, said piezoelectric member having a pair of electrodes connected thereto, the flexing of said piezoelectric member resulting in an EMF between said pair of electrodes; and electronic device means electrically connected with said pair of electrodes of said piezoelectric member for providing a predetermined effect attractive to fish in response to said EMF.

2. The electrified fishing lure of claim 1, wherein said piezoelectric member comprises a piezoelectric film.

3. The electrified fishing lure of claim 2, wherein said piezoelectric film has a first side and an opposite second side; wherein further said fishing lure further comprises flexible film means located adjacent at least one of said first and second sides for regulating the flexing of said piezoelectric member so as to optimize said EMF.

4. The electrified fishing lure of claim 3, wherein said piezoelectric film comprises a piezopolymer film.

5. The electrified fishing lure of claim 2, wherein a portion of said lure body is structured for flexing in response to movement of said lure body through water; wherein further said piezoelectric film is located at said portion of said lure body.

6. The electrified fishing lure of claim 2, further comprising a rotatable member rotatably connected with said lure body so that said rotatable member rotates in relation to said lure body in response to movement of said lure body through water; wherein said piezoelectric film is located with respect to said lure body so that said rotatable member periodically strikes said piezoelectric film to thereby cause said piezoelectric film to periodically flex in response to movement of said lure body through water.

7. The electrified fishing lure of claim 2, wherein said electronic device is an illumination device and said predetermined effect is emission of light from said lure body.

8. An electrified fishing lure, comprising:
a lure body;
a piezoelectric member flexibly connected to said lure body so that said piezoelectric member flexes in response to said lure body being moved through water, said piezoelectric member comprising:

a piezoelectric film having a first side and an opposite second side;

a first electrode connected to said first side of said piezoelectric film;

a second electrode connected to said second side of said piezoelectric film, wherein flexing of said piezoelectric film results in an EMF between said first and second electrodes; and flexible film means located adjacent at least one of said first and second sides for regulating the flexing of said piezoelectric film so as to optimize said EMF; and illumination device means electrically connected with said pair of electrodes of said piezoelectric member for providing a predetermined illumination effect attractive to fish in response to said EMF.

9. The electrified fishing lure of claim 8, wherein a portion of said lure body is structured for flexing in response to movement of said lure body through water; wherein further said piezoelectric member is located at said portion of said lure body.

10. The electrified fishing lure of claim 9, further comprising a rotatable member rotatably connected with said lure body so that said rotatable member rotates in relation to said lure body in response to movement of said lure body through water; wherein said piezoelectric member is located with respect to said lure body so that said rotatable member periodically strikes said piezoelectric member to thereby cause said piezoelectric film to periodically flex in response to movement of said lure body through water.

* * * * *